Figure 1:
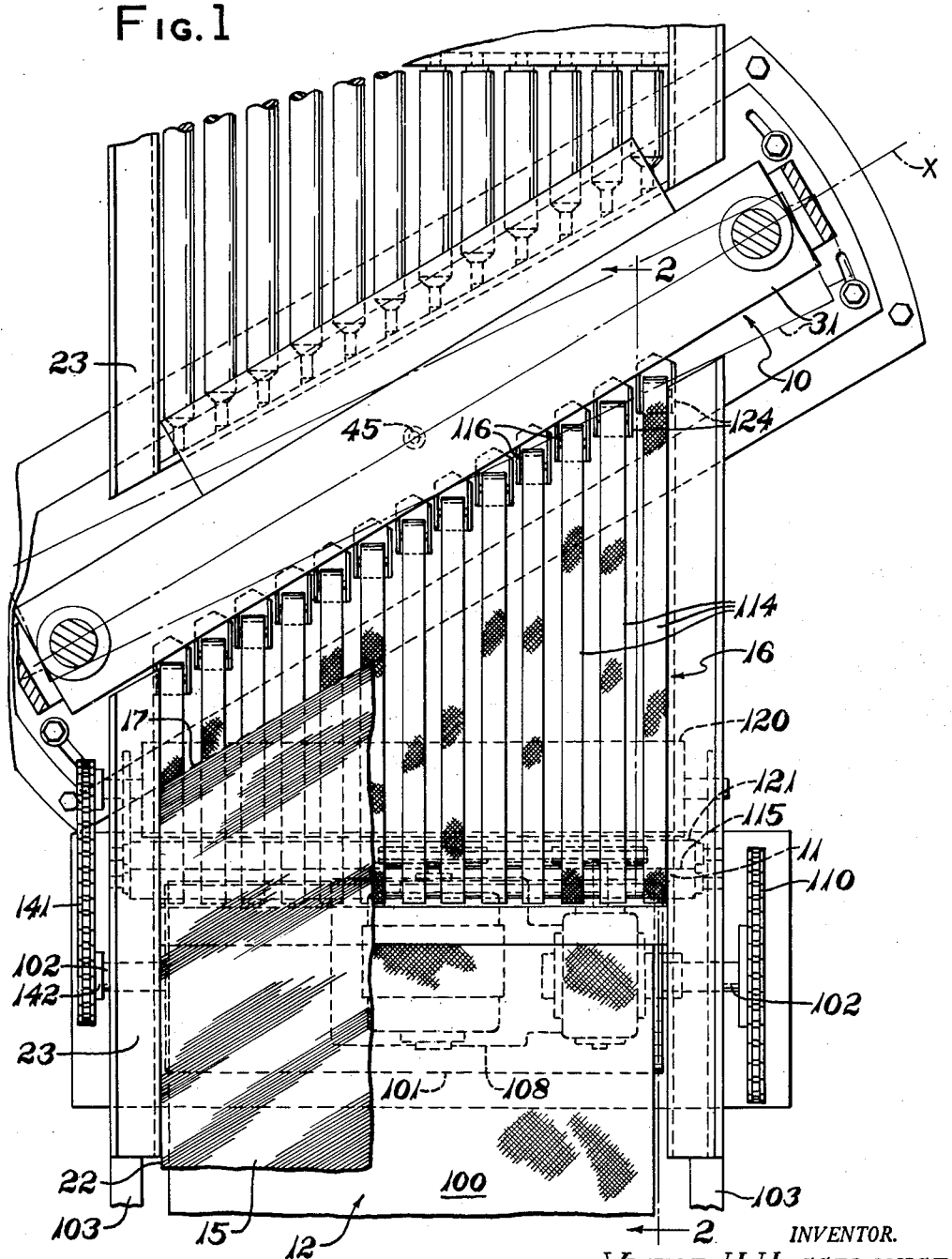

June 5, 1962 V. H. HASSELQUIST 3,037,548
BELT CONVEYOR APPARATUS
Original Filed July 17, 1956 2 Sheets-Sheet 1

INVENTOR.
VICTOR H. HASSELQUIST
BY John D. Haney
ATTY.

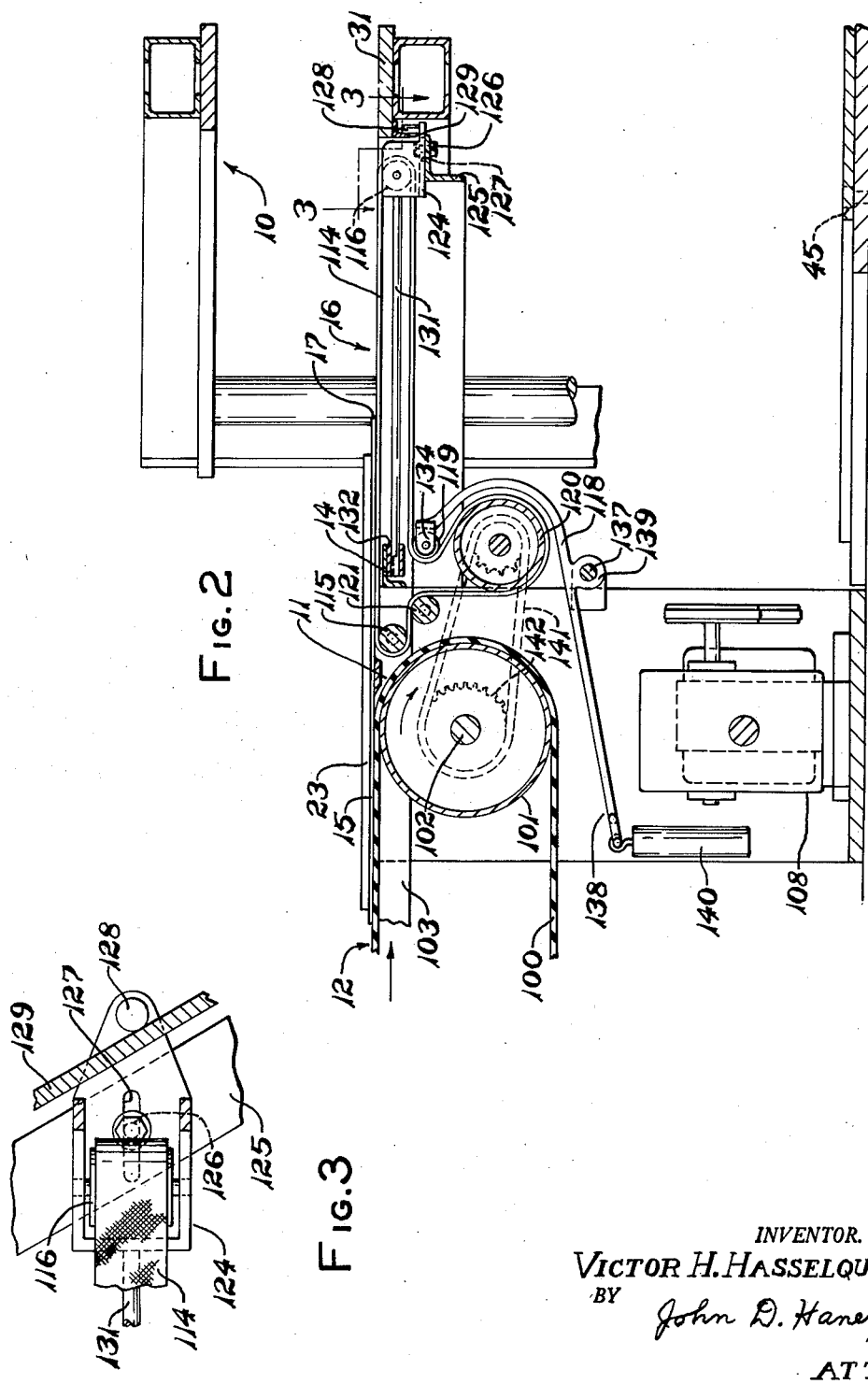

United States Patent Office 3,037,548
Patented June 5, 1962

3,037,548
BELT CONVEYOR APPARATUS
Victor H. Hasselquist, Akron, Ohio, assignor to The B. F. Goodrich Company, New York, N.Y., a corporation of New York
Original application July 17, 1956, Ser. No. 598,313. Divided and this application Oct. 28, 1960, Ser. No. 65,706
9 Claims. (Cl. 156—556)

This invention relates to a belt conveyor apparatus especially suitable for transferring fabric sheet material to various processing equipment. The present application is a division of a copending application, Serial No. 598,313, filed July 17, 1956, which discloses a system for splicing fabric sheet material such as bias cut pieces of tire cord stock into a continuous strip. The equipment used in such splicing system includes a belt conveyor apparatus made according to the present invention for transferring bias cut pieces of tire cord fabric to the splicing mechanism of the system.

The belt conveyor apparatus of this invention is characterized in that it has a delivery end which is angularly adjustable relative to the direction in which material is carried on the conveyor. Accordingly, even though the relative position of the adjoining material-receiving equipment and the conveying direction of the conveyor is changed from time to time the delivery end of the conveyor may be presented to the material-receiving equipment at the same orientation. The tire cord splicing system described in parent application Serial No. 598,-313 is an example of a system in which this invention may be advantageously used. The tire cord is bias cut at one location and the cut pieces are then transferred in succession to a splicer mechanism by suitable conveying means including a conveyor according to this invention which has its delivery end immediately adjoining the splicer mechanism. When the angular position of the splicer mechanism is shifted relative to this conveyor to accommodate stock pieces bias cut at different bias angles, the angle of the delivery end with respect to the conveying direction may be correspondingly shifted so that the delivery end remains parallel to the splicing mechanism in its new position. Therefore the bias cut pieces are transferred to the splicing mechanism in a uniform manner regardless of the particular angular setting of the splicer mechanism or the bias angle of the cord pieces.

An additional feature of this conveyor apparatus is that the angular adjustment of the delivery end may be accomplished automatically with a change in the relative angular position between the material-receiving equipment such as the splicer mechanism and the conveying direction of the conveyor apparatus.

According to the invention, the conveyor apparatus embodies two or more parallel endless belts having their load-carrying reaches laterally spaced for collectively supporting the material carried on the conveyor. Each belt at the forward end of its load-carrying reach is trained downwardly about a spool which is mounted in a small cage for adjustment in the same direction in which the belt is trained. The several spools together with the cages in which the pools are mounted collectively form the delivery end of the conveyor apparatus. Ordinarily the spools are arranged in echelon so that the load-carrying reaches of the belts are progressively longer from one side of the conveyor to the other. The angle of the delivery end may be changed relative to the train of the load-carrying reaches of these belts by relocating the positions of the several spool cages thereby changing the length of the load-carrying reaches of the belts. By engaging the spool cages with the receiving equipment the locations of the spool cages are automatically and proportionally adjusted simultaneously in response to a change in the angular position between the receiving equipment and the load-carrying reaches of the belts. A slack take-up mechanism is provided for each belt to maintain belt tension and preferably the spool cage of each belt is maintained in biased engagement with the receiving equipment through the belt tension.

The invention will be further described with reference to the accompanying drawings which illustrate one preferred conveyor apparatus embodying this invention. The conveyor apparatus selected for illustration is particularly adapted for conveying pieces of bias cut tire cord to a splicing mechanism.

In the drawings:
FIG. 1 is a plan view of the conveyor apparatus in association with a splicing mechanism;
FIG. 2 is an elevational view of the conveyor apparatus, taken along the line 2—2 of FIG. 1, showing how the belts of the conveyor are trained;
FIG. 3 is an enlarged view of the head end spools of the belts, taken on the line 3—3 of FIG. 2.

Referring to FIG. 1, a conveyor apparatus according to this invention is installed as an apron conveyor 16 between the delivery end 11 of a socket feed conveyor 12 and a splicing mechanism 10. A piece of bias cut fabric 15 is delivered by the feed conveyor 12 to the apron conveyor 16. The latter conveyor moves the piece 15 to bring its leading edge 17 into splicing position within the splicer 10 adjacent the trailing edge of the preceding fabric piece (not shown) previously in the splicer. The splicer 10 is then operated to splice these adjoining edges. As soon as the splice is completed, the resulting strip is advanced forwardly (by means not shown) so that the next fabric piece 15 arriving at the splicer on conveyor 16 may be spliced to the end of this strip.

Each piece of bias cut fabric 15 is delivered to apron conveyor 16 with its cut edges 22 (the edges at which the cord ends are exposed) parallel to the travel direction of the feed conveyor 12, and with its cords parallel to its leading edge 17 and trailing edge, not shown. The leading edge 17 is, in turn, parallel to the oblique splicing axis X in FIG. 1 along which the splicer 10 is oriented relative to the longitudinal axis of the conveyors 12 and 16. The conveyors 12 and 16 each include a longitudinal guide rail 23 at one side against which one of the bias cut edges 22 of the fabric is positioned as it moves toward the splicer 10.

The feed conveyor 12 includes a flexible belt 100 which is trained at its delivery end 11 about a head pulley 101 (FIG. 2). Only the forward portion of belt 100 and the head pulley are shown in FIGS. 1 and 2, the head pulley 101 being supported on a shaft 102 journalled in side frame members 103 of the apparatus. The shaft 102 projects beyond the one side of the frame 103 and is rotated by an appropriate drive unit 108 below the conveyor 12 and a chain 110 to a sprocket on shaft 102.

Apron conveyor 16 is directly in front of the splicer 10 and has a series of narrow, flexible, laterally spaced belts 114 each with an upper load-carrying reach extending to the table 31 of the splicer 10. The load-carrying reaches of the belts 114 are of different lengths. Each is trained forwardly from a common tail roll 115 (FIG. 2) forming the receiving end of conveyor 16 to and around one of an echelon of narrow spools 116. The spools 116 collectively define the delivery end of the apron conveyor presented to the splicer 10.

The length of the load-carrying reach of each belt 114 is self-adjusting by a take-up arm 118 and by the manner in which the spool 116 is mounted. As shown in FIG. 2, each belt 114 in its return reach is trained from a spool 116 rearwardly to and around a slack take-up spool 119 mounted on one end of the take-up arm 118. Then each belt 114 is trained around a common drive roll 120 and upward over a common idler roll 121 to the common tail roll 115. The term "common" means that all the belts 114 engage rolls 115, 120 and 121, whereas each belt has a separate take-up spool 119 and spool 116.

The spool 116 of each belt is individually mounted in a small cage 124, as best seen in FIGS. 2 and 3. The cage 124 is loosely connected by a stud 126 to a beam 125 extending transversely between the side frame members 103 of the apron conveyor 16 near its delivery end. The stud 126 extends through a slot 127 in the bottom of the cage 124 so that the cage may be shifted forward or backwardly in the direction of travel of the belt 114. The front portion of the bottom of the cage projects under the adjoining edge of the table 31 of splicer 10 and terminates in a vertical cylindrical pin 128 which is tangentially engaged with a downwardly extending flange 129 along the front edge of the table 31 of the splicer. Below the upper reach of each belt 114 a guide rod 131 extends rearwardly from the cage 124, and at its opposite extremity is slidably engaged in a bracket 132 mounted on a cross frame member 15 in front of roll 115. The rod 131 ensures that each cage 124 will remain at all times in accurate alignment with its belt.

The slack take-up pulley 119 is mounted in a clevis 134 at the upper end of the rigid take-up arm 118. This arm 118 is curved to concentrically embrace the drive pulley 120, and extends rearwardly over a transverse fulcrum bar 137 which is supported between the side frame members 103, to which arm 118 is pivotally connected by a collar 139 integral with the arm. The opposite end 138 of the take-up arm 118 has a weight 140 suspended from it, the weight acting to pull the end 138 of arm 118 pivotally downward about fulcrum 137 to establish the desired tension in the belt 114. The tension in each belt 114 is individually regulated by its respective take-up arm 118 and weight 140, although all the arms 118 are supported on a common fulcrum bar 137. The tension in each belt biases the cage 124 of each belt so that the pin 128 is held snugly against the flange 129 on the splicer table 31.

The belts 114 are collectively driven so that their upper reaches move toward table 31 and splicer 10 by the common drive roll 120 about which each belt is snubbed by its respective take-up pulley 119 and the roll 121. Drive pulley 120 is driven by a chain 141 about a suitable sprocket 142 (FIG. 1) on shaft 102.

Owing to the biased engagement of pins 128 with flange 129 of the table 31 and the way in which the cages 124 are loosely mounted on pins 126, the upper reaches of all belts 114 are simultaneously and proportionately adjusted to the length required when the angular position of splicer 10 is adjusted on its pivot 45. For example, when the splicer is adjusted clockwise about its pivot 45 as viewed in FIG. 1, to shift table 31 to the position indicated in chain dotted line, the upper reaches of the shorter belts 114 at the left side of apron conveyor 116 will be automatically extended, whereas the upper reaches of the belts 114 near the other side of apron 16 will be correspondingly shortened. This occurs because for a clockwise adjustment of the table 31 of the splicer, the portion of flange 129 in the table 31 which engages the pins 128 of the several cages of the shorter belts moves pivotally relative to the pins and pushes each pin 128 forward proportionately to the displacement of the portion of table flange 129 engaging the pin, thereby sliding its cage 124 forwardly on beam 125, the slot 127 in each cage sliding forwardly relative to its stud 126. The guide rod 131 prevents the cage 124 from twisting as the cage is moved forwardly. The additional longitudinal force imposed on the short belts 114 resulting from the forward displacement of their respective cages 124 therefore urges the take-up spools 119 of these belts forwardly, thereby pivotally swinging the respective arms 118 clockwise on the fulcrum bar 137 and raising the respective weights 140.

Conversely, the upper reaches of the longer belts in FIG. 1 are shortened by a clockwise adjustment of table 31, because when the table 31 is moved clockwise, flange 129 tends to move away from the pins 128 of the cages of the longer belts. This tends to relieve tension in the longer belts 114, and accordingly their weights 140 will sink, thus shortening the upper reaches of these belts and sliding their respective cages 124 rearwardly until their pins 128 are again seated snugly against the flange 129. A counterclockwise adjustment of splicer 10 about its pivot 45 correspondingly effects the opposite adjustment in the upper reaches of belts 114. Regardless of the angular position of the splicer relative to the apron conveyor, the upper reach of each of the belts 114 terminates exactly at the front edge of table 31.

While this invention has been described with reference to a specific embodiment, changes and modifications within the scope of the invention as set forth in the appended claims will be readily apparent to those skilled in the art to which it pertains.

I claim:

1. In a system for splicing bias cut pieces of elastomeric cord fabric wherein a delivery conveyor advances pieces of said fabric in a direction parallel to their bias cut edges toward a splicing mechanism disposed transversely to the conveying direction of said delivery conveyor and which splicing mechanism is mounted for angular adjustment relative to the delivery conveyor to correspond to the angle at which the fabric pieces are bias cut; the combination of a belt conveyor apparatus connecting said delivery conveyor and said splicing mechanism, said belt conveyor apparatus comprising a plurality of laterally-spaced belts each having an upper load-carrying reach extending from said delivery conveyor to said splicing mechanism, said load-carrying reaches of the belts being of progressively greater length from one side of said conveyor to the opposite side, and means supporting each belt for automatically and proportionally adjusting the length of said load-carrying reach of each belt in response to a change in the angular position of said splicing mechanism relative to said delivery conveyor.

2. Belt conveyor apparatus for transferring sheet material to material-receiving equipment which equipment is mounted for angular adjustment relative to the conveying direction of said conveyor, said apparatus comprising a plurality of endless belts having laterally spaced load-carrying reaches for collectively supporting the material moved on said conveyor, a plurality of separate spools collectively defining the delivery end of said conveyor apparatus about which spools said belts are separately trained into their return reaches, and means mounting each said spool for adjustment of the spool individually in the direction in which the belt thereon is trained to vary the length of the load-carrying reach of each said belt whereby the angular orientation of said delivery end may be adjusted to correspond with the angular position of said material-receiving equipment.

3. Apparatus according to claim 2 wherein said belt conveyor apparatus further comprises means for connecting each said spool-mounting means to said material-receiving equipment whereby adjustment of said spool-mounting means is automatically effected in response to a change in the angular position of said material-receiving equipment.

4. Belt conveyor apparatus comprising a plurality of endless belts trained to provide a series of laterally spaced load-carrying reaches, a plurality of separate spools collectively defining the delivery end of said conveyor apparatus about which spools said belts are separately trained at the forward ends of their load-carrying reaches, and means mounting each said spool for adjustment of the spool individually in the direction in which the belt thereon is trained to vary the length of the load-carrying reach of each belt whereby the angular orientation of said delivery end may be adjusted relative to the conveying direction of said belts.

5. Belt conveyor apparatus according to claim 4 and further comprising means engaging said spool-mounting means for movement pivotally relative to said mounting means to displace said mounting means simultaneously to effect said angular adjustment of said delivery end.

6. Belt conveyor apparatus comprising means for supporting a plurality of endless belts at a receiving end of said apparatus, a plurality of spools collectively defining a delivery end of said apparatus, a plurality of separate endless belts each trained from said belt-supporting means and over one of said spools to provide a series of laterally spaced load-carrying reaches for collectively supporting material on said belts, each spool being separately mounted in a cage at said delivery end, a frame member to which said cages are slidably connected for movement relative to said frame member and to each other in the direction of the train of the belt associated with each cage, and means engaged with said cages for pivotal movement relative to the cages to collectively adjust the location of said cages in echelon on said frame member and thereby change the length of the load-carrying reaches whereby the angle of the delivery end of said apparatus is adjusted.

7. Belt conveyor apparatus according to claim 6, wherein said cages are maintained in biased engagement with said cage-adjustment means.

8. Belt conveyor apparatus according to claim 7 wherein said cages are biased against said cage-adjustment means by tension in the belts.

9. Belt conveyor apparatus according to claim 6 wherein there is an alignment rod mounted on each said cage and extending in the direction in which such cage is movable, and a fixed bearing engaged with said rod to maintain alignment of the spool in such cage and its associated belt.

References Cited in the file of this patent

UNITED STATES PATENTS

| | | |
|---|---|---|
| 2,487,149 | Leguillon | Nov. 8, 1949 |
| 2,585,834 | Pecock | Feb. 12, 1952 |
| 2,601,929 | Brichard | July 1, 1952 |
| 2,702,579 | Perry | Feb. 22, 1955 |
| 2,940,506 | McKee | June 14, 1960 |